United States Patent
Shamasundar et al.

(10) Patent No.: US 10,755,490 B2
(45) Date of Patent: Aug. 25, 2020

(54) DATA BROKER ENGINE FOR MANAGING DATA EXCHANGES BETWEEN ON-BOARD AND OFF-BOARD SYSTEMS

(71) Applicant: HONEYWELL INTERNATIONAL INC., Morris Plains, NJ (US)

(72) Inventors: Raghu Shamasundar, Karnataka (IN); Philip Toews, Phoenix, AZ (US); Srihari Jayathirtha, Karnataka (IN); Kalimulla Khan, Karnataka (IN); Mahesh Sivaratri, Karnataka (IN); Sreenivasan Govindillam K, Karnataka (IN); Robert Brownlee, Phoenix, AZ (US); Richard Snyder, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 88 days.

(21) Appl. No.: 15/989,352

(22) Filed: May 25, 2018

(65) Prior Publication Data

US 2019/0362567 A1   Nov. 28, 2019

(51) Int. Cl.
| | |
|---|---|
| *G07D 5/00* | (2006.01) |
| *G07C 5/08* | (2006.01) |
| *G07C 5/00* | (2006.01) |
| *H04W 4/42* | (2018.01) |
| *G08G 5/00* | (2006.01) |

(52) U.S. Cl.
CPC .......... *G07C 5/008* (2013.01); *G07C 5/0841* (2013.01); *G08G 5/0013* (2013.01); *G08G 5/0039* (2013.01); *H04W 4/42* (2018.02)

(58) Field of Classification Search
CPC .............................. G07C 5/008; G07C 5/0841
See application file for complete search history.

(56) References Cited

U.S. PATENT DOCUMENTS

| | | | |
|---|---|---|---|
| 5,457,800 | A | 10/1995 | Howells et al. |
| 2005/0216151 | A1* | 9/2005 | Gawlik ................. G07C 5/008 701/31.4 |
| 2010/0023201 | A1 | 1/2010 | Kinney et al. |
| 2013/0267186 | A1 | 10/2013 | Agarwal et al. |
| 2016/0163202 | A1 | 6/2016 | Marion et al. |
| 2016/0290827 | A1 | 10/2016 | Cornell |
| 2017/0148329 | A1 | 5/2017 | Cornell |
| 2018/0018833 | A1 | 1/2018 | Kannappa |
| 2018/0091597 | A1* | 3/2018 | Kim ...................... H04W 4/023 |

* cited by examiner

*Primary Examiner* — Anshul Sood
(74) *Attorney, Agent, or Firm* — Bookoff McAndrews, PLLC (57) ABSTRACT

Systems and methods are disclosed for brokering data exchanges between on-board and off-board systems of a vehicle. One method comprises receiving, at a data broker engine, one or more data requests from an origination system, wherein each of the one or more data requests specifies at least one or more of a request type and a target system. Then the data broker engine determines whether the request type is a one-time transmission, a periodic transmission, an event-triggered transmission, or a change-triggered transmission. Following the determination, the data broker engine retrieves data from the target system based on the determined request type and transmits the data to the origination system.

17 Claims, 4 Drawing Sheets

DATA BROKER ENGINE FOR MANAGING DATA EXCHANGES BETWEEN ON-BOARD AND OFF-BOARD SYSTEMS

TECHNICAL FIELD

The present disclosure relates to methods and systems for a computer-implemented electronic data brokering service. More particularly, the present disclosure relates to methods and systems for brokering data exchanges between on-board and off-board systems of a vehicle.

BACKGROUND

In today's world, vehicle operation and route planning technology increasingly relies on computer-based systems for obtaining current, most up-to-date data in order to calculate the most efficient and economical navigation plan. Such computation not only involves data captured and kept on-board the vehicle, but also involves data collected and analyzed off-board. Therefore, provision of the most current data to the on-board system sometimes requires constant or regular data transmissions among various systems located on-board and off-board. However, on-board systems typically communicate with off-board systems through a communication channel with limited bandwidth (e.g., cellular or satellite coverage), which can be more prone to congestion and latency. As a vehicle in motion often requires data to be delivered and processed promptly for efficient and effective operation of the vehicle, latency caused by a strained network may impact the vehicle performance or passengers' comfort.

One of the main causes of a strained network can be an off-board system that continuously updates and transfers data to on-board as well as other off-board systems, based on constantly-changing, real-time vehicle-related data (e.g., vehicle characteristics including fuel, weather, traffic, etc.). Therefore, there is a need for a data broker system configured to control and manage data exchanges among various systems on-board and off-board.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

One embodiment provides a computer implemented method for brokering data exchanges between on-board and off-board systems of a vehicle, the method comprising: receiving, at a data broker engine, one or more data requests from an origination system, wherein each of the one or more data requests specifies at least one or more of a request type and a target system; determining, by the data broker engine, whether the request type is a one-time transmission, a periodic transmission, an event-triggered transmission, or a change-triggered transmission; retrieving, by the data broker engine, data from the target system based on the determined request type; and transmitting, by the data broker engine, the data to the origination system.

One embodiment provides a system for brokering data exchanges between on-board and off-board systems of a vehicle. The system may comprise one or more processors; and a non-transitory computer readable medium storing instructions that, when executed by the one or more processors, cause the one or more processors to perform a method comprising receiving, at a data broker engine, one or more data requests from an origination system, wherein each of the one or more data requests specifies at least one or more of a request type and a target system; determining, by the data broker engine, whether the request type is a one-time transmission, a periodic transmission, an event-triggered transmission, or a change-triggered transmission; retrieving, by the data broker engine, data from the target system based on the determined request type; and transmitting, by the data broker engine, the data to the origination system.

One embodiment provides a non-transitory computer readable medium for brokering data exchanges between on-board and off-board systems of a vehicle. The non-transitory computer readable medium may store instructions that, when executed by one or more processors, cause the one or more processors to perform a method comprising receiving, at a data broker engine, one or more data requests from an origination system, wherein each of the one or more data requests specifies at least one or more of a request type and a target system; determining, by the data broker engine, whether the request type is a one-time transmission, a periodic transmission, an event-triggered transmission, or a change-triggered transmission; retrieving, by the data broker engine, data from the target system based on the determined request type; and transmitting, by the data broker engine, the data to the origination system.

BRIEF DESCRIPTION OF THE DRAWINGS

Embodiments of the invention will now be described, by way of example only, with reference to the accompanying drawings in which.

DETAILED DESCRIPTION

The following embodiments describe systems and methods for brokering data exchanges between on-board and off-board systems of a vehicle.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Figure 1:
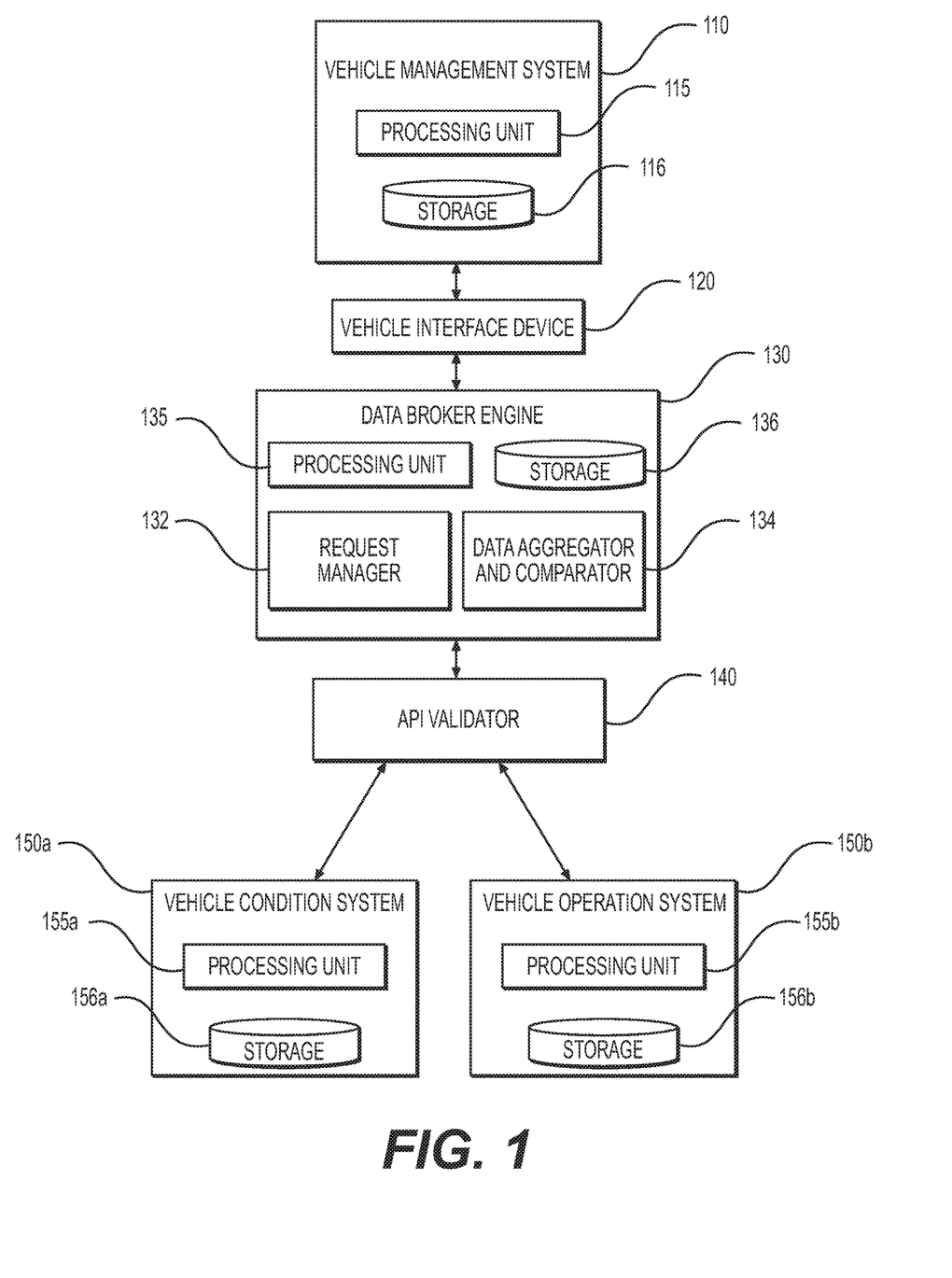
FIG. 1 is an exemplary embodiment of a data broker system that manages data exchanges between on-board and off-board systems of a vehicle.
Figure 2:
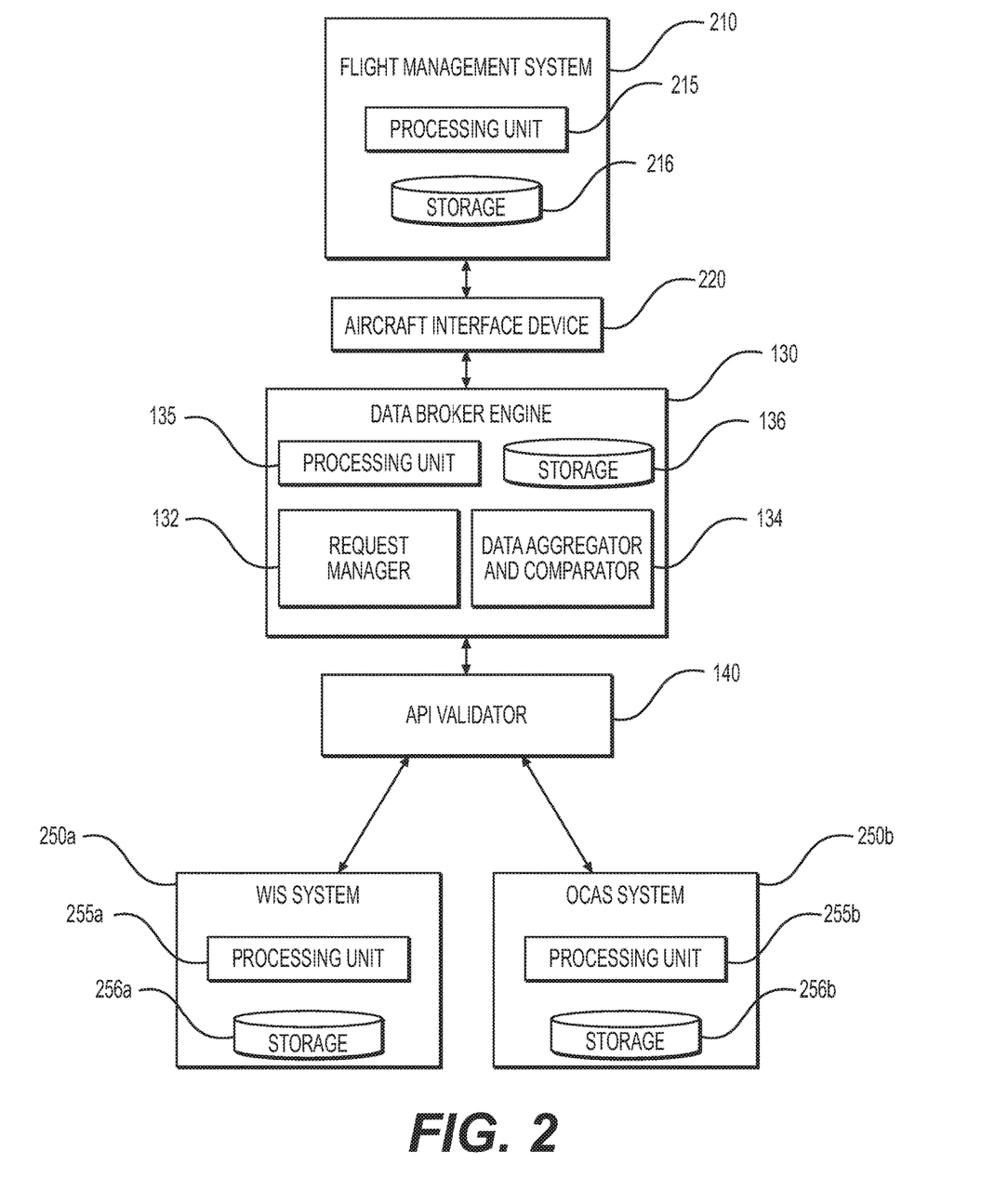
FIG. 2 is an exemplary embodiment of the data broker system shown in FIG. 1 implemented on an aircraft.

Referring now to the appended drawings, FIG. 1 shows an exemplary embodiment of a data broker system that manages data exchanges between on-board and off-board systems of a vehicle. In general, FIG. 1 depicts a vehicle management system (VMS) 110, a vehicle interface device 120, a data broker engine 130, an application programming interface (API) validator 140, a vehicle condition system 150a, and a vehicle operation system 150b. FIG. 2 shows an exemplary embodiment of the data broker system implemented for an aircraft. In general, FIG. 2 depicts a flight management system (FMS) 210, an aircraft interface device 220, a data broker engine 130, an API validator 140, a weather information service (WIS) system 250a, and an optimum cruise altitude selector (OCAS) system 250b. In the discussion below, reference will be made to both FIG. 1 and FIG. 2.

In FIG. 1, VMS 110 may be a specialized, embedded on-board computer system that automates various navigation and vehicle performance-related tasks, including but not limited to data calculations, data aggregation, data comparison, data storage, data transmission, data query and retrieval, and data display. To perform these tasks, VMS 110 may collect data from various sensors installed on the vehicle as well as from the vehicle condition system 150a and the vehicle operation system 150b. The VMS 110 may comprise a processing unit 115 and a storage 116. The VMS 110 may be used for any type of vehicle that can be manually and/or automatically maneuvered, including but not limited to aircrafts, cars, boats, motorcycles, bicycles, trains, helicopters, and spaceships. For example, FMS 210 shown in FIG. 2 is a type of VMS 110 that is used on aircrafts.

Vehicle condition system 150a and vehicle operation system 150b may be off-board support systems that communicate with the VMS 110 to obtain data available from the VMS 110 for further analysis/computation and provide other vehicle-related data to the VMS 110. For instance, the vehicle condition system 150a may be configured to generate, compare, store, receive, and/or transmit data relating to the condition of or the environment surrounding the vehicle (e.g., temperature, weather, traffic, etc.). The vehicle operation system 150b may be configured to generate, compare, store, receive, and/or transmit data relating to the operation of the vehicle (e.g., speed, altitude, step altitude, etc.). Each off board system (e.g., vehicle condition system 150a, vehicle operation system 150b) may comprise a processing unit (155a, 155b) and a storage (156a, 156b). Even though only vehicle condition system 150a and vehicle operation system 150b are shown in FIG. 1, there may be other types of off-board systems additionally in communication with the data broker engine 130. Other vehicle-related data that may be generated by the off-board systems may comprise any information pertinent to the operation of the vehicle, which may be used by the VMS 110 to assist in operating the vehicle in a safe, efficient, and/or otherwise optimal manner.

The off-board systems may be configured to collect, organize, and compare data, perform calculations based on the collected data, and transmit the data or the results of the calculations to other off-board systems and/or the VMS 110. In the case of an aircraft, the off-board systems may comprise a WIS system 250a and an OCAS system 250b, as shown in FIG. 2. The WIS system 250a may be configured to provide up-to-date weather data along the flight route and/or in the areas of interest, and assist the flight crew in making strategic, in-flight decisions (e.g., selecting/changing a flight plan). The OCAS system 250b may be configured to calculate the optimum cruise altitude in terms of fuel economy and performance of the aircraft, based on data gathered from the FMS 210 (e.g., real-time characteristics of the aircraft, flight plan, etc.) and other off-board systems (e.g., WIS system 250a), and provide the updated optimum cruise altitude to the FMS 210.

Vehicle interface device 120 may be a hardware platform that is configured to enable an interface and communications between the VMS 110 and a data broker engine 130. In the case of an aircraft, the vehicle interface device 120 may comprise an aircraft interface device 220 as shown in FIG. 2. The vehicle interface device 120 may provide an interface between the VMS 110 and the data broker engine 130 through a wide-area network (e.g., WAN or Internet) via wired or wireless connection. The WAN connection may be supplied by a cellular, or satellite connection. Thus, data exchanges between the VMS 110 and the data broker engine 130 may occur through the vehicle interface device 120 using the WAN connection. Considering the limited bandwidth available between the on-board VMS 110 and the data broker engine 130 (e.g., cellular or satellite connection), one of the main functions of the data broker engine 130 may be the ability for handling larger data flow arriving from the off-board systems 150a, 150b and controlling the amount of data transmitted to and from the VMS 110 by selectively transmitting data and/or data requests.

API validator 140 ensures that the data requests received from the off-board systems are in a consistent format by checking the data requests against validation rules. Once the data requests are validated, the data broker engine 130 processes the data requests by using the request manager 132 and the data aggregator and comparator 134. In some embodiments, the API validator 140 may be omitted and data may be exchanged directly between the data broker engine 130 and the off-board systems.

The data broker engine 130 may monitor and control data exchanges between the VMS 110 and the off-board systems 150a, 150b. As alluded to above, one of the main functions of the data broker engine 130 may be to reduce network congestion by selectively transmitting data and/or data requests. The data broker engine 130 may be implemented "in the cloud" (i.e., remotely or off-board), such that the data broker engine 130 may have better access (i.e., not impacted by relatively low bandwidth) to larger data flow arriving from the off-board systems 150a, 150b in communication with the cloud (e.g., the Internet). However, the data broker engine 130 may also be implemented as an on-board server. Data broker engine 130 may comprise a request manager 132 configured to process various types of data requests originating from either the VMS 110 or the off-board systems 150a, 150b. The specific request types handled by the request manager 132 will be further explained in the following sections. Data broker engine 130 may also comprise a data aggregator and comparator 134 configured to aggregate and compare data from the off-board systems 150a, 150b and the VMS 110, in order to determine whether certain data is desired to be transmitted to the destination. The operations of the data aggregator and comparator 132 will be further explained in the following sections.

Figure 3:
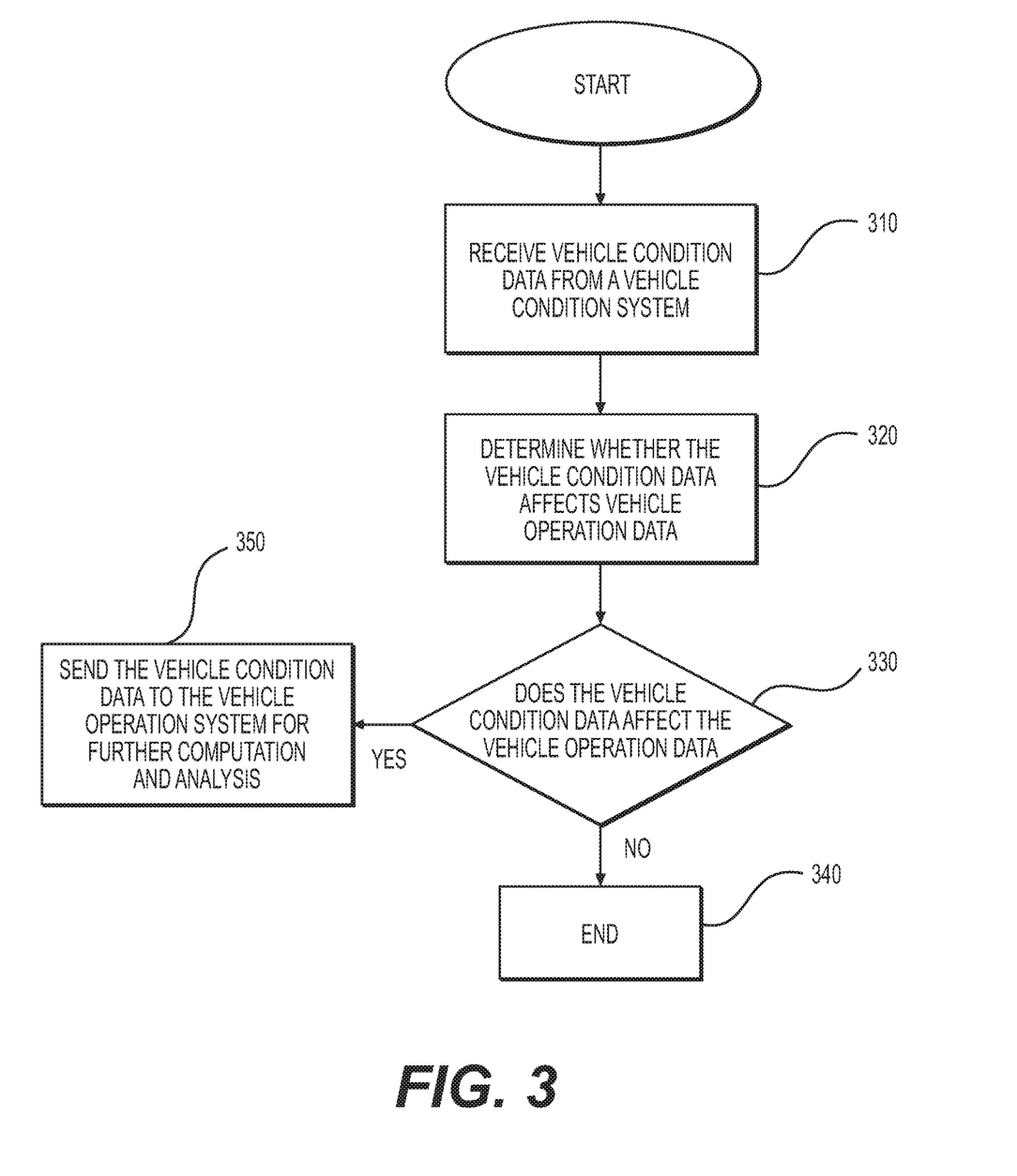
FIG. 3 is a flowchart illustrating an exemplary method of selectively distributing data using a data broker engine of the current disclosure.

FIG. 3 is a flowchart illustrating an exemplary method of selectively distributing data using a data broker engine 130 of the current disclosure. At step 310, the data aggregator and comparator 134 of the data broker engine 130 may receive vehicle condition data from a vehicle condition system 150a. The transmission of the vehicle condition data from the vehicle condition system 150a to the data broker engine 130 may be initiated (1) autonomously by the vehicle condition system 150a, and/or (2) based on a data request from one of the VMS 110 or vehicle operation system 150b. At step 320, the data aggregator and comparator 134 may determine whether the vehicle condition data affects vehicle operation data generated by the vehicle operation system 150b. If the data aggregator and comparator 134 determines that the vehicle condition data does not affect the vehicle operation data (step 330), the data broker engine 130 may not transmit the vehicle condition data and the process ends (step 340). On the other hand, if the data aggregator and comparator 134 determines that the vehicle condition data affects the vehicle operation data (step 330), the data broker engine 130 may transmit the vehicle condition data to the vehicle operation system 150b for further computation and analysis (step 350). For instance, upon receiving the vehicle condition data, the vehicle operation system 150b may update the vehicle operation data based on the received vehicle condition data. The updated vehicle operation data may also be distributed to the VMS 110 and/or the vehicle condition system 150a via the data broker engine 130.

As an example, the steps of FIG. 3 will now be described in relation to a data broker engine 130 implemented in an aircraft environment. At step 310, the data aggregator and comparator 134 may receive current wind data from the WIS system 250a. The transmission of the current wind data from the WIS system 250a to the data broker engine 130 may be initiated (1) autonomously by the WIS system 250a, and/or (2) based on a data request from the FMS 210 or OCAS system 250b. At step 320, the data aggregator and comparator 134 may determine whether the current wind data affects the optimal cruise altitude generated by the OCAS system 250b. If the data aggregator and comparator 134 determines that the current wind data does not affect the optimal cruise altitude (step 330), the data aggregator and comparator 134 may not transmit the current wind data and the process ends (step 340). On the other hand, if the data aggregator and comparator 134 determines that the current wind data affects the optimal cruise altitude, the data aggregator and comparator 134 may transmit the current wind data to the OCAS system 250b for further computation and analysis (step 350). For instance, the OCAS system 250b may update the optimum cruise altitude for the aircraft based on the received current wind data. The updated optimum cruise altitude may also be distributed to the FMS 210 via the data broker engine 130.

Figure 4:
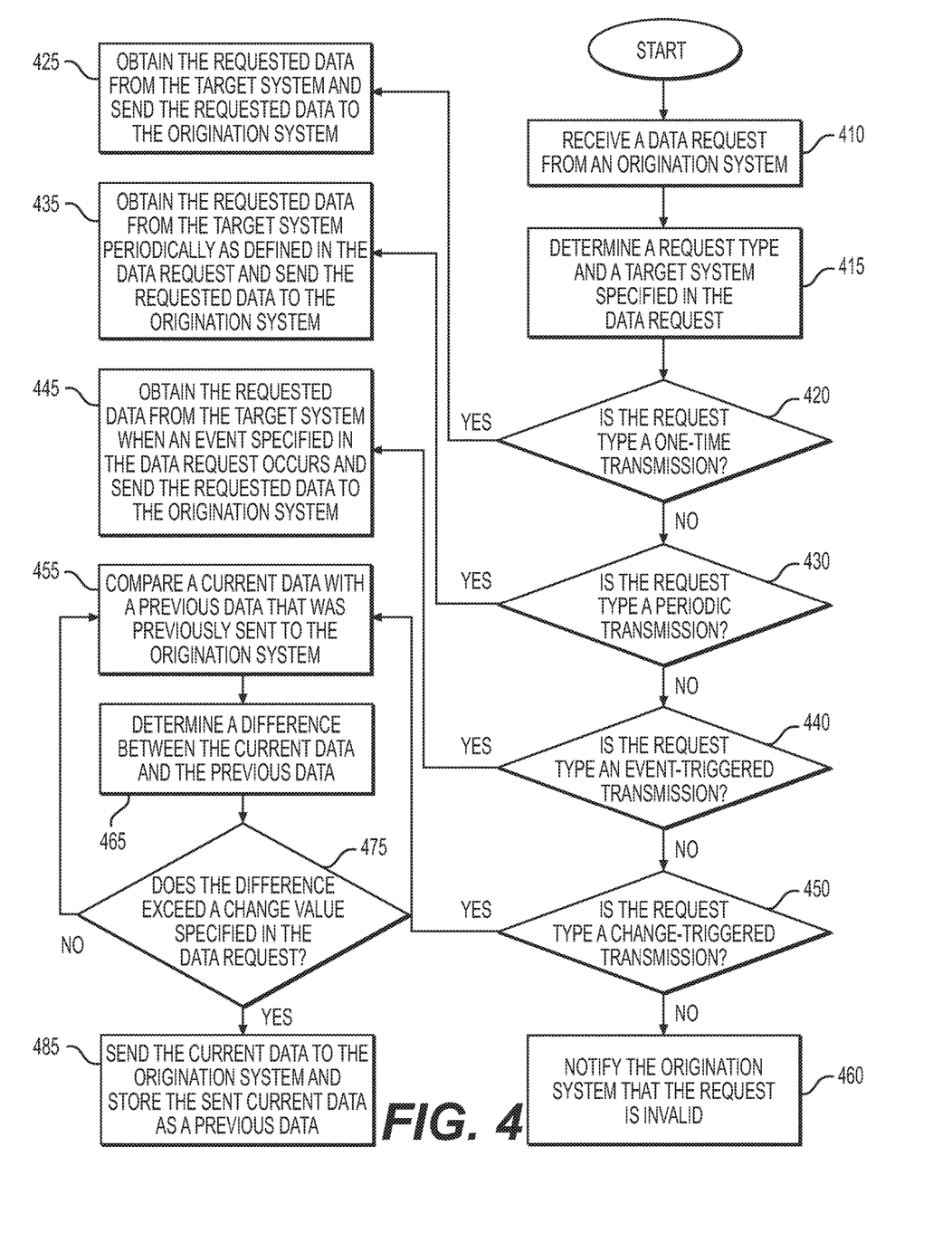
FIG. 4 is a flowchart illustrating an exemplary method of processing data requests using a data broker engine of the current disclosure.

FIG. 4 is a flowchart illustrating an exemplary method of processing data requests using a data broker engine 130 of the current disclosure. At step 410, the request manager 132 of the data broker engine 130 may receive a data request from an origination system. The origination system may be any one of the VMS 110 and off-board systems 150a, 150b that sends the data request to the data broker engine 130. At step 415, the request manager 132 may determine a request type and a target system specified in the data request. The data request manager 132 may also determine where the data request originated from (e.g., origination system) and the type of data being requested. The origination system and the requested data type may also be specified in the data request. The target system may be any one of the VMS 110 and off-board systems 150a, 150b from which the origination system requests data. The request type may define how often or under what condition(s) the requested data may be obtained from the target system. For example, the request type may be any one of the following: one-time transmission, periodic transmission, event-triggered transmission, and change-triggered transmission.

At step 420, the request manager 132 may determine whether the request type is a one-time transmission. If the request manager 132 determines that the request type is a one-time transmission, the data aggregator and comparator 134 may send the data request to the target system, obtain the requested data from the target system, and send the obtained data to the origination system.

If the request manager 132 determines that the request type is not a one-time transmission, the method proceeds to step 430 where the request manager 132 may determine whether the request type is a periodic transmission. If the request manager 132 determines that the request type is a periodic transmission, the data aggregator and comparator 134 may send the data request to the target system periodically (i.e., poll the target system periodically), as specified in the data request. Without limitation, time interval specified in the data request may be in seconds, minutes, hours, or days. For instance, the origination system may request data be obtained from the target system every five minutes. Upon receiving the requested data from the target system, the data aggregator and comparator 134 may send the requested data to the origination system.

In one embodiment, by system default or as predetermined by a system administrator, a minimum limit and/or a maximum limit may be set on the time interval, based on the type of data being requested, the target system, and/or the origination system. For example, a minimum limit may be set on the time interval such that certain data (or data at a certain target system) cannot be requested more often than every three seconds (i.e., to alleviate network congestion resulting from an excessive number of data transmissions). Likewise, a maximum limit may be set such that the interval cannot be set farther apart than one day (i.e., to prevent safety issues due to a lack of current data).

If the request manager 132 determines that the request type is not a periodic transmission, the method proceeds to step 440 where the request manager 132 may determine whether the request type is an event-triggered transmission. If the request manager 132 determines that the request type is an event-triggered transmission, the data aggregator and comparator 134 may send the data request to the target system based upon detecting an event specified in the data request, obtain the requested data from the target system, and send the obtained data to the origination system. A data request may specify one or more events. An event (i.e., a triggering event) may be any event that can be detected and reported by the target system (e.g., any of VMS 110, off-board system 150a, off-board system 150b). The target system may be configured in advance to monitor system activities for certain predetermined events and report the events to the data broker engine 130. For instance, if the data request specifies VMS 110 as the target system and "navigation plan modified by a user" as the event, the data aggregator and comparator 134 may send the data request to VMS 110 upon being notified by VMS 110 that the navigation plan has been modified by a user.

In another embodiment, the request manager 134, upon determining that the data request is for an event-triggered transmission, may immediately forward the data request to the target system, instructing the target system to monitor system activities for the specified event. Upon detecting the specified event, the target system may send the requested data to the data aggregator and comparator 134, which in turn sends the data to the origination system.

If the request manager 132 determines that the request type is not an event-triggered transmission, the method proceeds to step 450 where the request manager 312 may determine whether the request type is a change-triggered transmission. If the request manager 132 determines that the request is not a change-triggered transmission, the method proceeds to step 460 and the request manager 132 may notify the origination system that the request type is invalid. If the request manager 132 determines that the request is a change-triggered transmission, the method proceeds to step 455. A data request for a change-triggered transmission may comprise a change value representing a difference between a current data (i.e., most recent data) generated by the target system and a previous data that was previously generated by the target system and sent to the origination system.

At step 455, the data aggregator and comparator 134 may compare a previous data that was previously generated by the target system and sent to the origination system with a current data that is newly (or most recently) generated by the target system. The previous data may be retrieved from a storage 136 of the data broker engine 130. The newly generated data may be received by the data aggregator and comparator 134 from the target system. At step 465, the data aggregator and comparator 134 may determine a difference between the current data and the previous data. If the difference between the previous data and the current data does not exceed the change value specified in the data request (step 475), the method loops back to step 455 and the data aggregator and comparator 134 may continue to compare any subsequently-generated data with the previous data. On the other hand, if the difference between the previous data and the current data exceeds the change value specified in the data request (step 475), the data aggregator and comparator 134 may send the current data to the origination system and store the sent current data as a previous data in the storage 136 (step 485). The previous data may be stored with a timestamp indicating the time of creation and/or transmission to the origination system, and an identifier indicating the origination system to which the previous data was delivered (e.g., VMS 110, off-board system 150a, or off-board system 150b).

In another embodiment, the request manager 132, upon determining that the data request is for a change-triggered transmission, may immediately forward the data request to the target system, instructing the target system to send the requested data to the data aggregator and comparator 134 when the difference between the current data and the previous data exceeds the change value specified in the data request. In such a case, the target system may be configured in advance to compare a current data with a previous data and to calculate the difference. The target system may also comprise a storage (116, 156a, or 156b) in which the current and previous data are stored. Upon determining that the difference between the current data and the previous data exceeds the change value, the target system may send the current data to the data aggregator and comparator 134 and store the current data as a previous data in the storage (116, 156a, or 156b). The previous data may be stored with a timestamp indicating the time of creation and/or transmission to the origination system, and an identifier indicating the origination system to which the previous data was delivered (e.g., VMS 110, off-board system 150a, or off-board system 150b). Upon receiving the current data from the target system, the data aggregator and comparator 134 may send the current data to the origination system. By transmitting the current data only if the difference between the current data and the previous data is significant enough (e.g., larger than a specified value), the disclosed embodiment reduces network congestion and preserves network bandwidth as well as processing capacity of the system resources (e.g., VMS 110, off-board systems 150a, 150b).

As an example, the steps of FIG. 4 will now be described in relation to a data broker engine 130 implemented in an aircraft environment. At step 410, the request manager 132 of the data broker engine 130 may receive a data request from an origination system. The origination system may be any one of the FMS 210, WIS system 250a, and OCAS system 250b, that sends the data request to the data broker engine 130. At step 415, the request manager 132 may determine a request type and a target system specified in the data request. The target system may be any one of the FMS 210, WIS system 250a, and OCAS system 250b, from which the origination system requests data. The request type may define how often or under what condition(s) the requested data may be obtained from the target system. For example, the request type may be any one of the following: one-time transmission, periodic transmission, event-triggered transmission, and change-triggered transmission.

At step 420, the request manager 132 may determine whether the request type is a one-time transmission. If the request manager 132 determines that the request type is a one-time transmission, the data aggregator and comparator 134 may send the data request to the target system to obtain the requested data, obtain the requested data from the target system, and send the obtained data to the origination system. For example, the data request may originate from the OCAS system 250b and specify FMS 210 as the target system for a one-time transmission. The request manager 132 may determine that the request type of the data request is a one-time transmission and the data aggregator and comparator 134 may send the data request to the FMS 210. The FMS 210 may return the requested data (e.g., flight plan) to the data aggregator and comparator 134, which may in turn send the data to the OCAS system 250b.

If the request manager 132 determines that the request type is not one-time transmission, the method proceeds to step 430 where the request manager 132 may determine whether the request type is a periodic transmission. If the request manager 132 determines that the request type is a periodic transmission, the data aggregator and comparator 134 may send data requests to the target system periodically (i.e., poll the target system periodically), as specified in the data request from the origination system. For example, the request manager may determine that the data request originates from the FMS 210 (i.e., origination system), designates the OCAS system 250b as the target system, and requests optimum cruise altitude data periodically, with the time interval set as ten minutes. The data aggregator and comparator 134 may then send the data request to the OCAS system 250b every ten minutes to obtain the optimum cruise altitude data and send the optimum cruise altitude data to the FMS 210 every ten minutes.

If the request manager 132 determines that the request type is not a periodic transmission, the method proceeds to step 440 where the request manager 132 may determine whether the request type is an event-triggered transmission.

If the request manager 132 determines that the request type is an event-triggered transmission, the data aggregator and comparator 134 may send the data request to the target system based upon detecting an event specified in the data request, obtain the requested data from the target system, and send the obtained data to the origination system from which the data request was sent. The target system may be configured in advance to monitor system activities for certain predetermined events and report the detected events to the data broker engine 130. For example, the request manager 132 may determine that the data request originates from the OCAS system 150b (e.g., origination system), designates the FMS 210 as the target system, and requests updated flight plan data to be transmitted upon every pilot-initiated flight plan update. The data aggregator and comparator 132 may then send the data request to the FMS 210 upon being notified by the FMS 210 that the flight plan has been updated by the pilot.

In another embodiment, the request manager 134, upon determining that the data request is for an event-triggered transmission, may immediately forward the data request to the FMS 210, instructing the FMS 210 to monitor system activities for the pilot-initiated flight plan update. Upon detecting the pilot-initiated flight plan update, the target system may send the updated flight plan data to the broker engine 130, which may in turn send the data to the origination system.

If the request manager 132 determines that the request type is not an event-triggered transmission, the method proceeds to step 450 where the request manager 312 may determine whether the request type is a change-triggered transmission. If the request manager 132 determines that the request is not a change-triggered transmission, the method proceeds to step 460 and the request manager 312 may notify the origination system that the request type is invalid. If the request manager 132 determines that the request is a change-triggered transmission, the method proceeds to step 455.

At step 450, the request manager 132 may determine that the data request from the FMS 210 includes a request for an optimum cruise altitude data from the OCAS system 250b, with a change value of 100 feet. The data aggregator and comparator 314 may then compare an optimum cruise altitude data that was previously sent to the FMS 210 with a current optimum cruise altitude data generated by the OCAS system 250b (step 455), and determine a difference between the previous and the current optimum cruise altitude data (step 465). If the difference does not exceed the change value of 100 feet (step 475), the method loops back to 455 and the data aggregator and comparator 134 continues to compare any subsequently-generated optimum cruise altitude data with the previous data. On the other hand, if the difference exceeds the change value of 100 feet (step 475), the data aggregator and comparator 134 may send the current optimum cruise altitude data to the FMS 210, and store the sent data as a previous data in the storage 136 (step 485).

In another embodiment, the request manager 132, upon determining that the data request from the FMS 210 is for a change-triggered transmission, may immediately forward the data request to the OCAS system 250b, instructing the OCAS system 250b to send the requested data to the data aggregator and comparator 134 when the difference between the current optimum cruise altitude data and the previous optimum cruise altitude data exceeds the change value of 100 feet. In such a case, the OCAS system 250b may be configured in advance to compare the current and previous optimum cruise altitude data and to calculate the difference. The OCAS system may also comprise a storage 256b in which the current and previous optimum cruise altitude data are stored. Upon determining that the difference exceeds the change value, the target system may send the current optimum cruise altitude data to the data aggregator and comparator 134 and store the sent data as a previous data in the storage 256b.

As discussed above, OCAS system 250b may calculate the optimum cruise altitude based on real-time aircraft characteristics. A newly calculated optimum cruise altitude may be consumed by the FMS 210 to ensure optimum flight. However, every time the FMS 210 consumes a newly-calculated optimum cruise altitude, the real-time aircraft characteristics may change, causing the OCAS 250b to produce a new optimum cruise altitude. This may result in a constant data flow from the OCAS system 250b to the FMS 210. By using the above exemplary method of the current disclosure, for example, the data broker engine 130 can control the amount and frequency of optimum cruise altitude data transmitted to the FMS 210 through the communication network connecting the on-board and off-board systems (e.g., between FMS 210 and data broker engine 130). In addition, the data broker engine 130 can control the amount and frequency of data transmission of various data types between an on-board and an off-board system, as well as between off-board systems, by enabling different types of data requests suited for varying circumstances and data needs.

Embodiments of the present disclosure concerning data brokering between on-board and off-board systems addresses the drawbacks of the prior approaches, using some of the techniques discussed above. In general, the data brokering method in accordance with the embodiments of the present disclosure has at least the following distinguishable features that lead to significant technical improvements in the fields of vehicle management, network management, data management, and distributed/cloud computing:

1) selective data transmission which allows for reduction in network congestion and latency, especially in the communication network connecting the on-board and off-board systems;

2) management of data exchanges between off-board and on-board systems that is customizable via multiple types of data requests; and 3) intelligent data broker engine that enables delivery of critical data at the right time, without straining the network while ensuring safe and optimal vehicle operation.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable storage medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer-implemented method of brokering data exchanges between on-board and off-board systems of a vehicle, comprising:
   receiving, at a data broker engine, a data request from an origination system, wherein the data request specifies a request type and a target system;
   determining, by the data broker engine, whether the request type specified in the data request is a one-time transmission, a periodic transmission, an event-triggered transmission, or a change-triggered transmission;
   in response to the request type being the change-triggered transmission:
      determining, by the data broker engine, a change value specified in the data request;
      retrieving, by the data broker engine, data from the target system;
      determining a difference between the data retrieved from the target system and a previous data, wherein the previous data was previously retrieved from the target system and transmitted to the origination system, the origination system being located remotely from the target system over a network; and
      in response to the difference exceeding the change value, transmitting, by the data broker engine, the data to the origination system.

2. The computer-implemented method of claim 1, further comprising:
   in response to the request type being the periodic transmission:
      determining, by the data broker engine, a time interval specified in the data request;
      retrieving, by the data broker engine, data from the target system periodically based on the time interval; and
      transmitting, by the data broker engine, the data periodically to the origination system.

3. The computer-implemented method of claim 1, further comprising:
   in response to the request type being the event-triggered transmission:
      determining, by the data broker engine, an event specified in the data request;
      transmitting, by the data broker engine, the data request specifying the event to the target system;
      in response to the target system detecting an occurrence of the event, retrieving, by the data broker engine, data from the target system; and
      transmitting, by the data broker engine, the data to the origination system.

4. The computer-implemented method of claim 1, wherein the difference is determined by the target system or the data broker engine.

5. The computer-implemented method of claim 1, wherein the origination system is implemented on-board, the data broker engine is implemented off-board on a cloud, and the target system is implemented off-board and connected to the cloud.

6. The computer-implemented method of claim 1, wherein the data broker engine is implemented off-board on a cloud.

7. A system for subscribing to messages generated from a plurality of edge devices, comprising:
   one or more processors; and
   a non-transitory computer readable medium storing instructions that, when executed by the one or more processors, cause the one or more processors to perform a method of brokering data exchanges between on-board and off-board vehicle management systems for vehicle operation comprising:
   receiving, at a data broker engine, a data request from an origination system, wherein the data request specifies a request type and a target system;
   determining, by the data broker engine, whether the request type specified in the data request is a one-time transmission, a periodic transmission, an event-triggered transmission, or a change-triggered transmission;
   in response to the request type being the change-triggered transmission:
      determining, by the data broker engine, a change value specified in the data request;
      retrieving, by the data broker engine, data from the target system;
      determining a difference between the data retrieved from the target system and a previous data, wherein the previous data was previously retrieved from the target system and transmitted to the origination system, the origination system being located remotely from the target system over a network; and in response to the difference exceeding the change value, transmitting, by the data broker engine, the data to the origination system.

8. The system of claim 7, wherein the instructions further cause the one or more processors to perform:
in response to the request type being the periodic transmission:
determining, by the data broker engine, a time interval specified in the data request;
retrieving, by the data broker engine, data from the target system periodically based on the time interval; and
transmitting, by the data broker engine, the data periodically to the origination system.

9. The system of claim 7, wherein the instructions further cause the one or more processors to perform:
in response to the request type being the event-triggered transmission:
determining, by the data broker engine, an event specified in the data request;
transmitting, by the data broker engine, the data request specifying the event to the target system;
in response to the target system detecting an occurrence of the event, retrieving, by the data broker engine, data from the target system; and
transmitting, by the data broker engine, the data to the origination system.

10. The system of claim 7, wherein the difference is determined by the target system or the data broker engine.

11. The system of claim 7, wherein the origination system is implemented on-board, the data broker engine is implemented off-board on a cloud, and the target system is implemented off-board and connected to the cloud.

12. The system of claim 7, wherein the data broker engine is implemented off-board on a cloud.

13. A non-transitory computer readable medium storing instructions that, when executed by one or more processors, cause the one or more processors to perform a method of brokering data exchanges between on-board and off-board vehicle management systems for vehicle operation comprising:
receiving, at a data broker engine, a data request from an origination system, wherein the data request specifies a request type and a target system;
determining, by the data broker engine, whether the request type specified in the data request is a one-time transmission, a periodic transmission, an event-triggered transmission, or a change-triggered transmission;

in response to the request type being the change-triggered transmission:
determining, by the data broker engine, a change value specified in the data request;
retrieving, by the data broker engine, data from the target system;
determining a difference between the data retrieved from the target system and a previous data, wherein the previous data was previously retrieved from the target system and transmitted to the origination system, the origination system being located remotely from the target system over a network; and
in response to the difference exceeding the change value, transmitting, by the data broker engine, the data to the origination system.

14. The non-transitory computer readable medium of claim 13, wherein the instructions further cause the one or more processors to perform:
in response to the request type being the periodic transmission:
determining, by the data broker engine, a time interval specified in the data request;
retrieving, by the data broker engine, data from the target system periodically based on the time interval; and
transmitting, by the data broker engine, the data periodically to the origination system.

15. The non-transitory computer readable medium of claim 13, wherein the instructions further cause the one or more processors to perform:
in response to the request type being the event-triggered transmission:
determining, by the data broker engine, an event specified in the data request;
transmitting, by the data broker engine, the data request specifying the event to the target system;
in response to the target system detecting an occurrence of the event, retrieving, by the data broker engine, data from the target system; and
transmitting, by the data broker engine, the data to the origination system.

16. The non-transitory computer readable medium of claim 13, wherein the difference is determined by the target system or the data broker engine.

17. The non-transitory computer readable medium of claim 13, wherein the origination system is implemented on-board, the data broker engine is implemented off-board on a cloud, and the target system is implemented off-board and connected to the cloud.

* * * * *